Jan. 5, 1937. G. W. SIMON 2,067,102
AUTOMOBILE MOTOR WARMER
Filed July 10, 1936
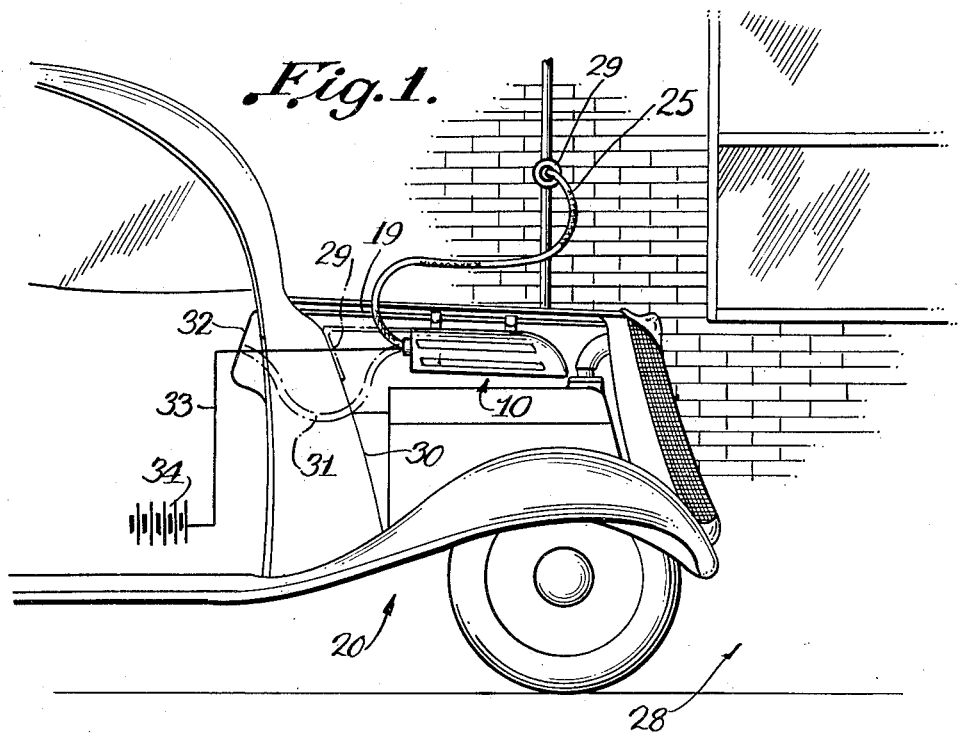
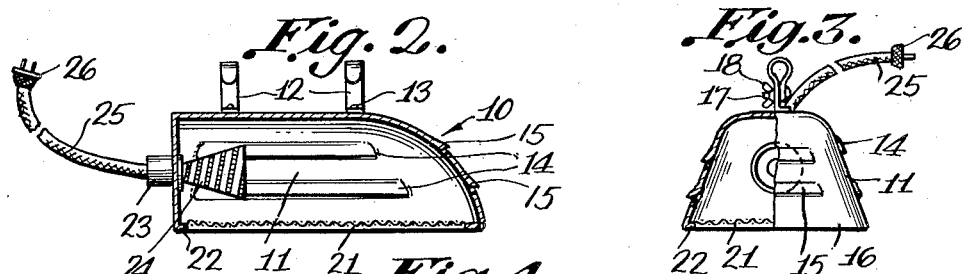
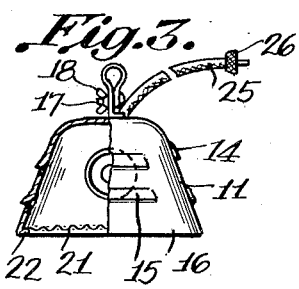
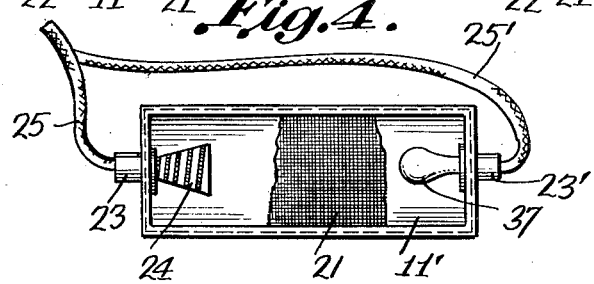
INVENTOR.
GEORGE W. SIMON.
BY Miller & Miller
ATTORNEYS.

Patented Jan. 5, 1937

2,067,102

UNITED STATES PATENT OFFICE 2,067,102

AUTOMOBILE MOTOR WARMER

George W. Simon, Hollidays Cove, W. Va.

Application July 10, 1936, Serial No. 89,995

6 Claims. (Cl. 219—38)

This invention relates to an automobile motor warmer and has for an object to provide an improved motor warmer, especially intended to be used on automobiles but likewise useable on motors of other vehicles, such as trucks, airplanes, boats or the like.

A further object of this invention is to provide a motor warmer which is operated by electricity, securing the supply of electricity either from the battery or from any convenient outlet while the car is in a garage.

A further feature of this invention is that the heater may be either attached permanently beneath the hood of the car or it may be quickly and easily hooked into position temporarily, and furthermore may be provided with an electrical conductor leading to the dashboard of the vehicle so that an extension wire may be plugged therein from a convenient outlet without the necessity of lifting the hood of the vehicle.

A further object of this invention is to provide a motor warmer which may utilize either a heating unit or an electric light bulb as a source of heat within the warmer.

A further object of this invention is to provide a motor warmer which may be inexpensively manufactured of sheet material and which is further provided with a protective screen on the bottom thereof to prevent the heating unit or electric light bulb from being accidently damaged.

With the foregoing and other objects in view, as will hereinafter become apparent, this invention comprises the construction, combination, and arrangement of parts hereinafter disclosed, claimed and illustrated in the accompanying drawing, wherein:

Fig. 1 is an elevational view of the motor warmer in operative position.

Fig. 2 is a longitudinal sectional view of one form of this invention which may be attached temporarily to any automobile.

Fig. 3 is an end view partly broken away of Fig. 2, and

Fig. 4 is a bottom plan view of another form of this invention having more than one heating element therein.

The automobile motor warmer shown at 10 comprises a sheet metal case 11, having a pair of suspension hooks 12 riveted to the top thereof, as of 13. Extending along the opposite of the sheet metal case 11 are a pair of louvres 14, while a shorter pair of louvres 15, extend along the end 16 of the case 11.

In Fig. 3, the hooks are shown as being in the form of clamps 17 having winged nuts 18 for more permanently attaching the heater to the radiator rod 19 of the automobile 20.

Extending across the bottom is a strong screening 21, held in position by the means of inturned flanges 22, on the case 11. Extending through one end of the case 11 is a socket 23 adapted to receive a heating element 24 to be inserted therein in the usual manner. This socket 23 is of the standard size and hence can interchangeably receive a heating element 24 as shown or an electric light bulb of any suitable power, should the regulation heat element 24 be unavailable.

An electrical conductor 25 extends from the socket 23 to a plug 26 for connection to any suitable source of electrical energy, such as the outlet 27 placed on the wall of the garage 28 in which the heater may be stored.

If a heater of greater size is desired it may be made in the form shown in Fig. 4, with an additional socket 23' placed in the other end of the casing 11'. As here shown, an electric light bulb has been inserted into the socket 23', and an electrical conductor 25' branches off conductor 25 for connection to any suitable source of electricity.

Screen 21 serves to eliminate fire hazard should any fumes or gasoline escape from the motor and be exposed to the heating element.

If the heater is to be left permanently in position in the automobile, then either the clamping means shown as 17 and 18 may be utilized, or alternatively, an angle arm 29 may be provided with which to secure it to the bulkhead of the automobile. When the heater is thus more or less permanently attached to the automobile 20, then the electrical conductor as at 31 may lead to a socket permanently in position on the dashboard 32 of the automobile 20. In such a form, any suitable extension line or drop cord may be plugged into the socket of the dashboard 32 from any convenient source of supply, thus eliminating the necessity of raising the hood in order to connect up the heater to an outside source of electrical energy.

As an alternative form, a power line may be provided leading to the heater from the battery 34 of the automobile, thus making the heater independent of the availability of any outside source of electrical energy. By providing a suitable heating element, both the power line 33 to the battery 34, and the electrical connection 30 or 25 may be used in the same heater, so that an outside source of electrical energy may be utilized to supply the necessary heat whenever the same is available as when the car is placed in a garage, but also making it possible to keep the motor warm when the car is parked on the street or in any other position where no outside source of heat is available. In the later case, a convenient switch serves to connect up the power line 33 to the battery 34 of the automobile.

The novel features and the operation of this device will be apparent from the foregoing description. While the device has been shown and the structure described in detail, it is obvious that this invention is not to be considered limited to the exact form disclosed, and that changes may be made therein within the scope of what is claimed without departing from the spirit of the invention.

Having thus set forth and disclosed the nature of this invention, what is claimed is:—

1. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing and a protective screen supported on the open bottom of said casing.

2. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing and a protective screen supported on the open bottom of said casing, said casing being provided with an inturned flange in said open bottom for supporting the said screen.

3. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing, and a protective screen supported on the open bottom of said casing, said casing being provided with an inturned flange in said open bottom for supporting said screen, a second electrical socket provided at the opposite end of said casing, and an electrical conductor branching from said first mentioned electrical conductor to said second mentioned socket.

4. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing and a protective screen supported on the open bottom of said casing, said casing being provided with an inturned flange in said open bottom for supporting said screen, said means for supporting said casing in an operative position comprising a pair of clamping members adapted to be secured to the radiator brace rod of the automobile.

5. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing, and a protective screen supported on the open bottom of said casing, said means for supporting said casing comprising an angle arm extending from the automobile bulkhead.

6. In an automobile motor warmer, the combination of a long narrow casing open at the bottom and adapted to be disposed over the motor of a vehicle, means supporting said casing in operative position, an electrical socket extending through one end of said casing adapted to support a heating unit within said casing, an electrical conductor connected to said socket, a pair of louvres extending along the sides of said casing, and a protective screen supported on the open bottom of said casing, said electrical conductor leading to the vehicle dashboard for connection to an outside source of electrical energy, and a second power line leading to the battery of the vehicle for placing the warmer in operation whenever an outside source of electrical energy is not available.

GEORGE W. SIMON.